US005661453A

United States Patent [19]
Justus et al.

[11] Patent Number: 5,661,453
[45] Date of Patent: Aug. 26, 1997

[54] WIRE HARNESS ASSEMBLY FIXTURE RETAINER HOLDER AND DETECTOR

[75] Inventors: George L. Justus, Northville; Vladimir Karasik, Oak Park, both of Mich.

[73] Assignee: United Technologies Automotive, Inc., Dearborn, Mich.

[21] Appl. No.: 504,005

[22] Filed: Jul. 19, 1995

Related U.S. Application Data

[63] Continuation of Ser. No. 228,339, Apr. 15, 1994, abandoned.

[51] Int. Cl.$^6$ .................................................. B60Q 1/00
[52] U.S. Cl. ..................... 340/438; 340/457.1; 340/590; 54/70
[58] Field of Search ........................... 340/438, 457.1, 340/667, 590; 54/70

[56] References Cited

U.S. PATENT DOCUMENTS

4,673,195  6/1987  Boyd et al. ..................... 340/457.1

Primary Examiner—Jeffery Hofsass
Assistant Examiner—Daryl C. Pope
Attorney, Agent, or Firm—William W. Habelt

[57] ABSTRACT

An apparatus for ensuring the proper existence and location of wire harness retainers along the length of a wire harness is provided. The apparatus is adapted to receive a wire harness retainer and, once the retainer is inserted, to generate a signal indicating the retainer has been inserted.

6 Claims, 5 Drawing Sheets

WIRE HARNESS ASSEMBLY FIXTURE RETAINER HOLDER AND DETECTOR

This is a continuation of application Ser. No. 08/228,339 filed on Apr. 15, 1994, now abandoned.

BACKGROUND OF THE INVENTION

1. Technical Field

This invention relates generally to an apparatus for providing positive recognition that a device to be retained is properly seated in its retainer, and, more, particularly to an apparatus for ensuring the wire harness has the proper number of retainers, and further for ensuring that these retainers are located at the proper intervals along the length of the harness.

2. Discussion of the Related Art

Wire harnesses, while appearing to be a relatively simply item, are often difficult to assemble. The number of wires involved, the manner in which the wires are bundled and branched from the main harness, the types of terminals that must be attached to the wires, and the number of harness retainers that must be secured to the harness greatly increase the complexity of the assembly task. As used throughout this discussion, a "wire harness" is a bundle of wires that is taped, sheathed or otherwise bundled together for routing between multiple points on a vehicle, such as an automobile; a "terminal" is a metal connection point between a wire and a connector housing; a "connector" is an interconnecting device attached to a terminal or group of terminals to facilitate the connecting of wire(s) to components or to other wires; "bundles" and "branches" within a wire harness are subgroupings of wires that are segregated from the main grouping of wires of the wire harness, usually to allow routing to separate areas, or to allow connection to terminals; and "retainers" are retention devices usually affixed to the wire harness at predetermined intervals along the length of the wire harness, where the retainers facilitate securing the wire harness along its routing path through the vehicle.

While many complex assembly tasks are now being handled by automated machinery and robots, the task of assembling wire harnesses often proves too complex to easily automate. Therefore, wire harnesses are largely manufactured by hand. However, the complexity of assembling a wire harness can often be a difficult task for the non-skilled and semi-skilled workers who frequently work on the assembly line. For these workers, the monotony of the task and the small size of the wires and terminals increases the likelihood that they may make an inadvertent error while assembling the wire harness. To aid the worker in properly assembling wire harnesses, a variety of fixtures and test devices have been fashioned.

There are several critical measurements of wire harness integrity, some of these being harness continuity, retainer presence and retainer positioning. Harness continuity is checked by determining if there is electrical continuity between each end of the harness. Usually this is done by connecting the connectors found along the wire harness to test connectors. An electrical current is then passed through the harness and is checked to see if it reaches the other end of the harness. Generally, the continuity check interrogates not only end-to-end wire circuit integrity, but also ensures that each wire-to-terminal connector connection is in the proper position. It is important to check continuity to ensure that the harness completes the proper electrical connections when mounted in the vehicle. Ensuring all of the retainers are present helps ensure that the wire harness is capable of being properly attached to the vehicle. Finally, retainer positioning along the wire harness is checked to ensure that all the required retainers are present, and that the retainers are also located at the proper intervals along the harness. It is important that all of the retainers be located at their proper intervals along the wire harness to ensure that they will mate with their corresponding receptacles on the vehicle to properly secure the wire harness to the vehicle when installed.

Ideally, it would be most efficient to be able to check for wire harness continuity, retainer presence and the interval positioning of the retainers in the same operation. Many different types of fixtures exist for checking wire harness continuity, but few currently exist for checking for retainer presence and retainer position intervals.

SUMMARY OF THE INVENTION

It is therefore an object of the present invention to provide an apparatus for checking for the presence of wire harness retainers and for checking retainer interval location in a single operation. This apparatus of the present invention is suitable for integration with existing wire harness continuity checking fixtures, or can be used by itself. This apparatus includes at least one retainer holding and detection device into which the retainer is inserted. The insertion of the retainer into the holder causes a detection signal to be generated by the detector. Ideally, there is one holder and detector for each retainer, and each holder and detector is located to coincide with the proper location of a retainer. When detection signals are generated by every detector, that means that all of the retainers are present and in their proper position. When combined with a wire harness continuity test fixture, the receipt of detection signals from every detector can be made to be a precondition to the generation of a satisfactory continuity check signal. One feature of the present invention is that the holder and detector is readily adapted to receive a variety of retainers without requiring significant modification. That allows the holder and detector to be used with many different types of wire harness retainers. One advantage of the present invention is that the integration of the holder and detector with a wire harness continuity test fixture can be accomplished with little added circuitry. Another advantage of the present invention is that the holder and detector can be made from inexpensive materials.

BRIEF DESCRIPTION OF THE DRAWINGS

Other objects, features and advantages of the present invention can be better understood by referencing the following discussion of the presently preferred embodiment in conjunction with the drawings in which.

DESCRIPTION OF THE PRESENTLY PREFERRED EMBODIMENT

Figure 1:
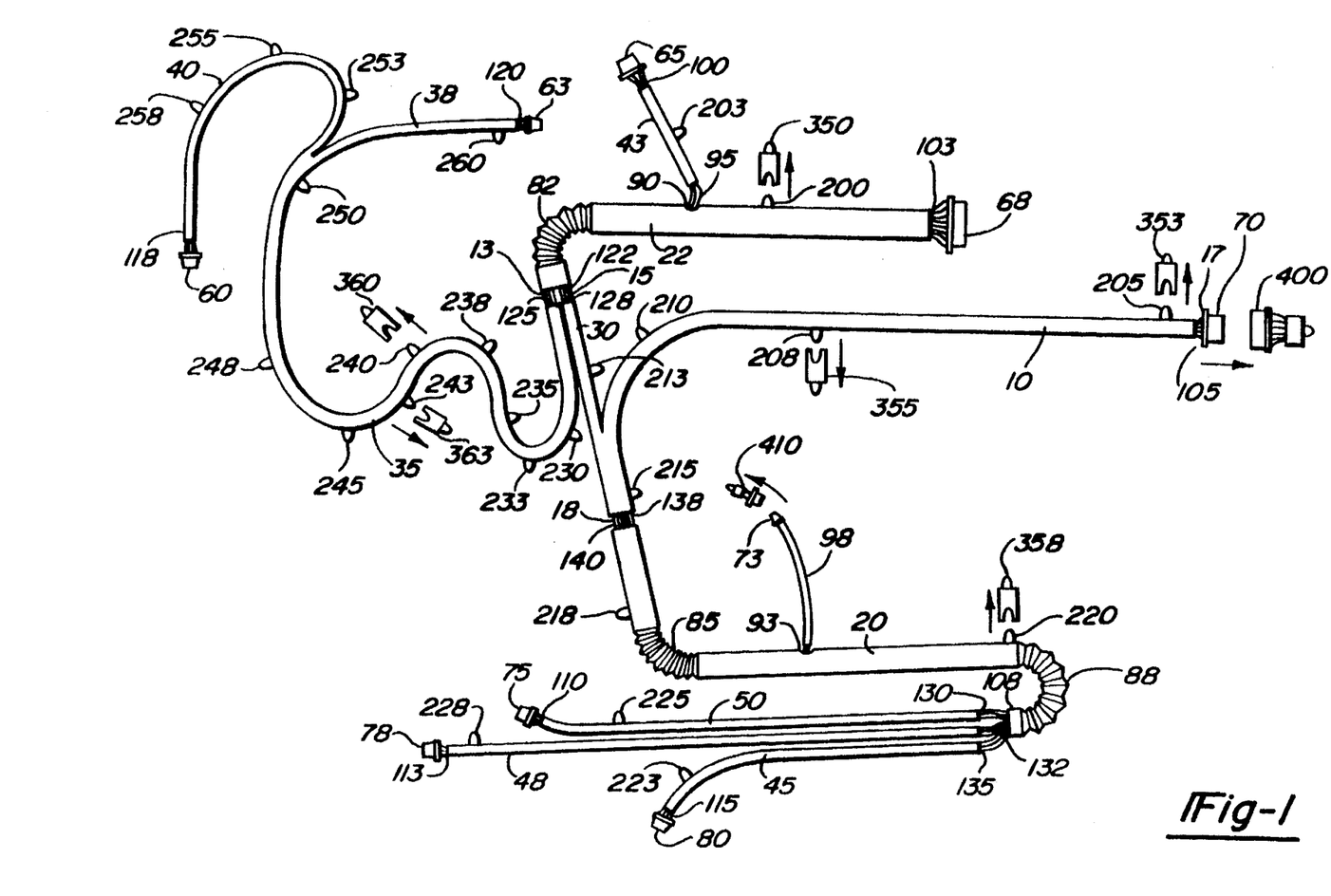
FIG. 1 is a diagram illustrating a wire harness as it would be mounted in a test fixture employing the holder and detector of the present invention.

As shown in FIG. 1, the present invention is adapted for the testing of wire harnesses during and after the assembly process. The wire harness 10 includes many different wires 13, 15, 17 bundled together in one or more grouping. The wires 13, 15, 17 are grouped to facilitate routing the wires within a vehicle, such as a car. As shown in this exemplar wire harness 10, there are some main trunks 20, 22 and several major branches 30, 33, 35, 38, 40, 45, 48, 50 in this harness 10, with several different connectors 60, 63, 65, 68, 70, 73, 75, 78, 80 that interconnect various electrical components and wire segments (not shown) to the harness 10. As shown here, there are several semi-rigid sections 20, 22 with flexible elbows 82, 85, 88, and several other semi-flexible sections 30, 33, 35, 38, 40, 45, 48, 50 sheathing the harness. While not critical to the understanding of this invention, the semi-rigid sections 20, 22 are formed from plastic tubing with a longitudinal slit extending the length of the section. The slit allows wires to be placed inside the tube sheathing. The semi-rigid sections 20, 22 may also have take-out holes 90, 93 at various places along the length of the tube sheathing. The take-out holes 90, 93 allow smaller sections of wire 95, 98 to branch out of the tubing. The semi-flexible sheathing sections 30, 33, 35, 38, 40, 45, 48, 50 are formed by wrapped adhesive tape around the wire harness 10. This task is usually accomplished manually by factory workers. The sheathing of wire harnesses in semi-rigid and semi-flexible casings is well known in the art, and need not be discussed in any greater detail to understand the invention at hand.

The wire harness sheathing. (i.e. the semi-rigid sections 20, 22 and the semi-flexible sections 30, 33, 35, 38, 40, 45, 48, 50 serves several purposes. One primary purpose of the sheathing is for facilitate the routing of the wire harness 10 through the vehicle. If the wires 13, 15, 17 were left loose, it would be difficult to route the harness 10 through the vehicle because the loose wires would tangle with each other and with other items found on vehicles. Another purpose of the sheathing is that it facilitates the segregation of wires for attachment to the connectors 60, 63, 65, 68, 70, 73, 75, 78, 80. By its nature, the sheathing presents for attachment only those wires which extend out from the sheathing, either at take-out holes 90, 93 or at the ends of the sheathing sections 100, 103, 105, 108, 113, 115, 118, 120, 122, 125, 128, 130, 133, 135, 138, 140. For example, as shown in this exemplar, the wires from take-out hole 90 are wrapped by the adhesive tape to form a semi-flexible sheathing section 43; the wires enter the sheathing at one end 95 and emerge from the other end 100 for attachment to the terminals in connector 65. Another purpose of the sheathing is to protect the wires of the wire harness 10 from abrasion. Because wire harnesses must often be routed through small access holes in thin metal walls, the risk of scraping or cutting the wires as they pass through the vehicle access holes is reduced by encasing the wires in a protective sheathing. Also, the sheathing reduces the likelihood that wires will kink or be bent sharply as the wire harness is routed along the vehicle. Another purpose of the sheathing, and the purpose directly related to the present invention, is to facilitate the attachment of the wire harness 10 to the vehicle along its routing path. This is accomplished by providing retainers, or attachment points, at various points along the length of the wire harness.

Figure 2:
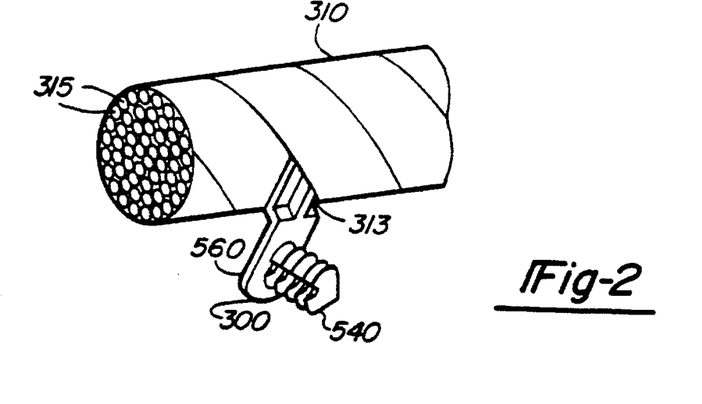
FIGS. 2 and 3 are perspective breakaway illustrations of exemplary wire harness sections with a retainer secured to the harness sheathing.
Figures 3, 4:
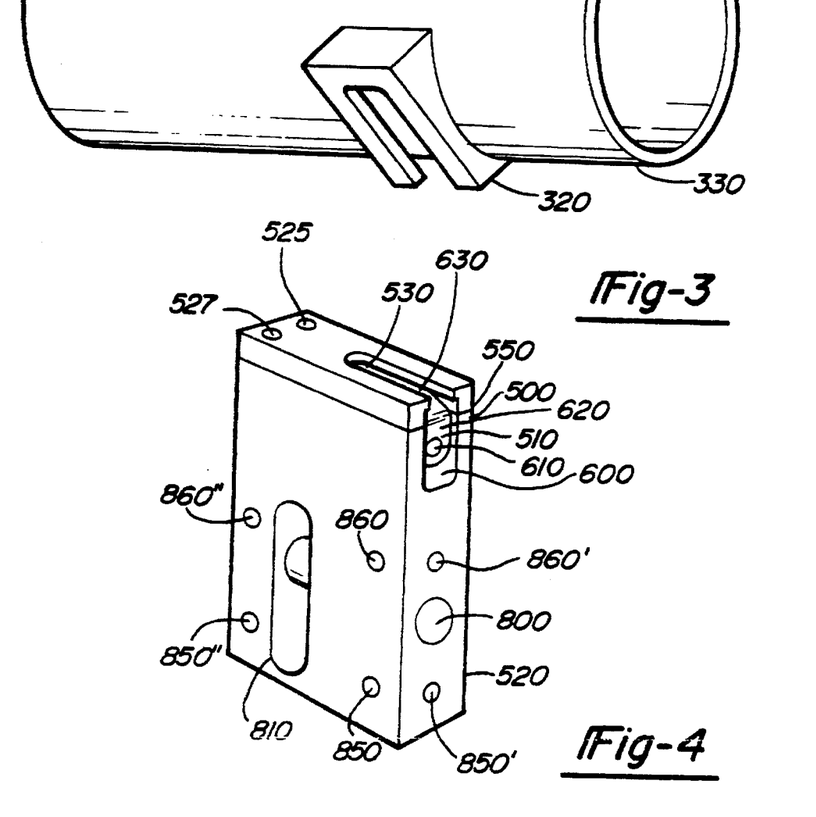
FIG. 4 is a perspective illustrating the holder and detector assembly.
Figure 5:
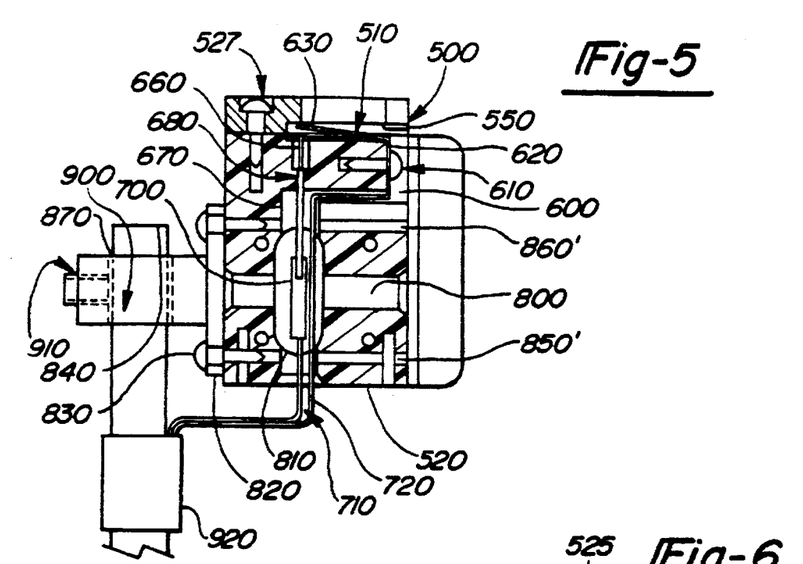
FIGS. 5, 6 and 7 are top, side and front plan views, respectively, detailing the construction of the holder and detector assembly.

As shown in FIG. 1, the wire harness 10 has various retainers 200, 203, 205, 208, 210, 213, 215, 218, 220, 223, 225, 228, 230, 233, 235, 238, 240, 243, 245, 248, 250, 253, 255, 258, 260 located at various points along the length of the semi-rigid 20, 22 and semi-flexible 30, 33, 35, 38, 40, 45, 48, 50 sheathing sections. As can be better seen in FIGS. 2 and 3, the retainers can take a variety of forms. Here, as shown in FIG. 2, there is a "christmas tree" type retainer 300 attached to a semi-flexible section 310 of sheathing by being wrapped 313 in the adhesive tape along with the wires 315; and, as shown in FIG. 3, a channel-type retainer 320 is formed along the sidewall of a section of semi-rigid sheathing 330. The christmas tree retainer 300 is a common type of wire harness retainer used to mate with a mounting hole formed in the vehicle body. Likewise, the channel retainer 320 is a common type of retainer used to slide over the heads of body panel screws and bolts to mount the wire harness to the body. Many other types of retainers are commonly used in the industry, and need not be specifically cataloged here to understand the invention. One common feature underlying all retainers, regardless of their form, is the purpose they serve: to provide an attachment point between the wire harness and the vehicle body for supporting and positioning the wire harness along its routing path.

As shown in FIG. 1, the retainers 200, 203, 205, 208, 210, 213, 215, 218, 220, 223, 225, 228, 230, 233, 235, 238, 240, 243, 245, 248, 250, 253, 255, 258, 260 can be used not only to secure the wire harness when it is installed in the vehicle but also to secure the wire harness in position during assembly and testing. To accomplish holding the harness during assembly and testing, holders are provided 350, 353, 355, 358, 360, 363. These holders are adapted to receive the retainers 200, 203, 205, 208, 210, 213, 215, 218, 220, 223, 225, 228, 230, 233, 235, 238, 240, 243, 245, 248, 250, 253, 255, 258, 260, and are located along the surface of the assembly work table in positions to coincide with the desired locations of the retainers. It should be appreciated that, as shown in the exemplar in FIG. 1, there may be holders for each of the retainers, or, as shown here, there may be holders for only a select number of retainers. Also, it should be appreciated that holders may be provided simply for the purpose of securing the harness during assembly, or simply for the purpose of testing the harness during assembly, and need not serve the dual purpose of securing the harness during assembly and during testing. The driving factor behind whether or not holders need be provided for each retainer is whether the holders are being used to secure the harness for assembly, whether it is determined to be necessary to secure the harness at each and every retainer during the assembly procedure, whether the holders are being used to assist in testing the harness, and whether it is determined to be necessary to ensure the location of each retainer as part of the testing procedure. Thus, one of ordinary skill in the art can appreciate that the generalized discussion presented here is for the purposes of illustrating the concepts of the invention, and should not be construed as being the only manner in which the invention can be practiced.

As set forth in this preferred embodiment, the holders 350, 353, 355, 358, 360, 363 serve to determine whether certain key retainers 200, 203, 205, 208, 210, 213, 215, 218, 220, 223, 225, 228, 230, 233, 235, 238, 240, 243, 245, 248, 250, 253, 255, 258, 260 are in their proper locations, and also serves to integrate the checking of retainer location with the wire continuity test performed on the harness at the end of the assembly task. Specifically, at the end of the assembly task, the wire harness 10 is secured by its retainers to the holders, and the various connectors are connected to the test connectors 400, 410. Although, in this exemplar, not all of the test connectors necessary to conduct a complete end-to-end wire harness continuity test are shown, one of ordinary skill in the art can appreciate that it would be necessary to have a mating test connector for each wire harness connector to conduct a full end-to-end wire harness continuity test. In order for the end-to-end continuity test to generate a "passing" or "satisfactory" signal result, there must be continuity along each wire between every connector terminal. For example, if a particular wire is supposed to be connected to the fifteenth pin terminal of connector 68 at one end and to the fourth pin terminal of connector 78, a signal sent from terminal pin fifteen of the test connector attached to connector 68 should reach terminal pin four of the test connector attached to connector 78. This type of electrical continuity check would be conducted for each wire in the harness. If all the wires had proper continuity, the continuity test result would be "passing" or "satisfactory".

The holders 350, 353, 355, 358, 360, 363 in this embodiment, as can be better seen in FIGS. 4, 5, 6 and 7, include a holding element 500 and a detecting element 510 mounted to a base 520. The holder 500 is secured to the base 520 by screws 525, 527. As shown in these figures, the holding element 500 is adapted to receive a christmas tree retainer 300, like that shown earlier in FIG. 2. The holding element 500 has a channel 530 that allows the shank 540 of the christmas tree retainer 300 to clear the holder, while the flange lip 550 extending around the periphery of the channel 530 allows the base 560 of the christmas tree retainer 300 to slide underneath the holding element 500. The detecting element 510 in this embodiment is a slightly obtuse L-shaped strip of conductive metal. At rest, the detecting element is biased toward the holding element 500. When the retainer 300 is inserted into the holding element 500, the base 560 of the retainer 300 causes the detecting element 510 to be deflected downward. The retainer 300 is thus sandwiched between the flange lip 550 and the detecting element 510.

As shown in FIGS. 4, 5, 6, and 7, the base 520 of the holder and detector is a block of plastic, in this case Celcon. The base 520 is approximately 2¼" tall, 1½" wide and ¾" thick. The base 520 is machined to have a detecting element mounting channel 600 near the top along one side. The detecting element 510 is mounted to the base 520 by screwing 610 the base leg 620 in the mounting channel 600, which allows the deflectable leg 630 to move freely toward the holding element 500. When deflected downward by the inserted retainer, the deflectable leg 630 contacts a contact pin 660 mounted in the base 520. There is a ¼" diameter vertical passageway 670 drilled upward from the bottom of the base toward the top, and a contact pin mounting hole 680 is countersunk at the top end of that passageway into which the contact pin 660 is inserted. The pin 660 may be glued to help secure it in position. The terminal portion 700 of the contact pin 660 extends downward into the vertical passageway 670, and has a wire 710 attached to it. Another wire 720 is attached to the detecting element 510 by sandwiching it between the base leg 620 and the detector base 520. Since the detecting element 510 is conductive material, in this case copper, deflecting the deflectable leg 630 downward onto the contact pin 660 completes an electrical circuit between the two wires 710, 720. Thus, the detecting element 510 completes an electrical circuit when the retainer 300 is inserted into the holder 500.

There are additional features of the holder and detector that will now be described. Besides having a vertical passageway 670, the base 520 also has a cross-wise passageway 800 and an oval access passageway 810. These passageways allow the wires 710, 720 to be routed toward the bottom, the front or back, or the sides, depending upon the manner in which the base 520 is mounted. Recalling the earlier discussion, the retainers are designed to hold the wire harness along its routing path through the vehicle. It can therefore be appreciated that the retainers may be oriented in any number of ways. Some retainers may be aligned vertically, some horizontally, and so on. Recalling FIG. 1, the various holders must be capable of being aligned in a number of different ways to match the alignment of their respective retainers. Referring again to FIGS. 4, 5, 6 and 7, it can be seen that a mounting base 820 is adapted to be screwed 830 to the holder base 520. There are seven sets of mounting holes 850, 860—two sets each on the front and back, one set on each side, and one set on the bottom—that are provided for receiving the screws 830. As provided here, the holder base 520 may be mounted to the mounting base 820 in many different ways, as will be described in greater detail later. The mounting base 820 has a boss 870 through which the fixture post 900 extends. The fixture post 900 is secured to the work table or surface to which the holder is desired to be secured. The fixture post 900 is secured within the boss 870 by a set screw 910. The fixture post 900 may include a wire retention collar 920 to secure the wires 710, 720 and help prevent the detector wires from being accidentally pulled or damaged.

Figures 6, 7, 8:
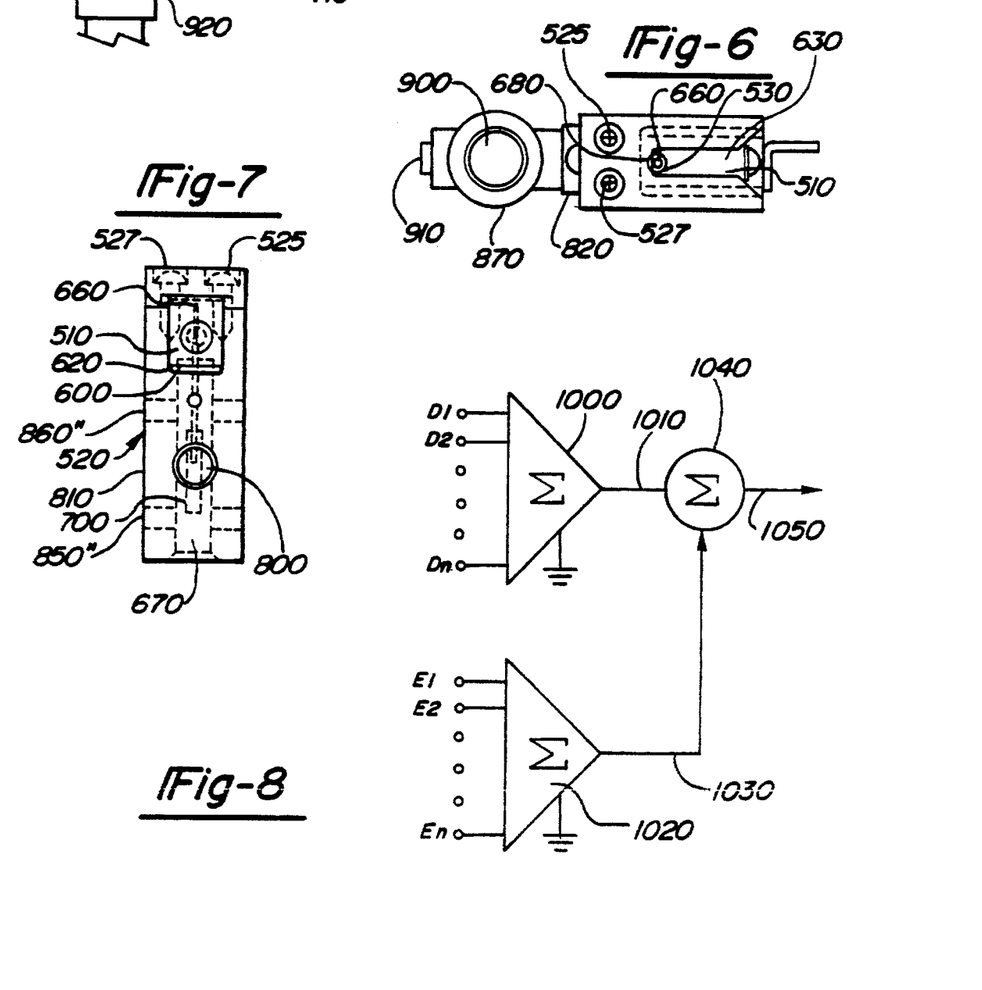
FIG. 8 is a block diagram functionally illustrating the manner in which the retainer position test is integrated with the wire harness continuity test.
Figure 9:
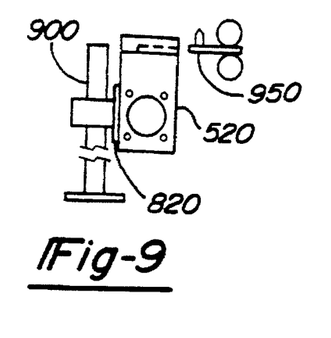
FIGS. 9 through 17 are illustrations of the variety of ways in which the holder and detector assembly can be mounted to accommodate the configuration.

As shown in the functional diagram in FIG. 8, the holder and detector circuit can be integrated into the wire harness continuity test circuit earlier described. Specifically, for each holder and detector, a "retainer present" signal is generated every time the deflectable leg 630 is deflected downward onto the contact pin 660 to complete the electrical circuit between the two wires 710, 720. This can be functionally represented as signals D1 through Dn. When all of the retainers are inserted into all of their respective holders, each detector will generate a "retainer present" signal, and the electrical summing 1000 of each detection signal D1–Dn would generate an "all retainers present" signal at the output 1010 of the summer 1000. Likewise, when all of the connectors are connected to their respective test connectors, the end-to-end continuity test would return "electrical continuity OK" signals for each wire which satisfactorily passes the continuity test. This can be functionally represented as signals E1–En. If all of the wires have continuity, the electrical sum 1020 of these signals would result in an "all wires have continuity" signal 1030 at the output of the summer 1020. Here, since the retainer presence test and wire continuity tests are integrated, the "all retainers present" signal 1010 would be electrically summed 1040 with the "all wires have continuity" signal 1030 to produce a "wire harness is OK to ship" signal 1050. One of ordinary skill can appreciate that any number of variations of such a testing procedure could be implemented using these concepts. As will now be described in greater detail, the manner in which the holder and detector can be mounted with respect to the test table or work surface can be easily adapted to suit the alignment of the retainers of the harness being tested.

As shown in FIGS. 9 through 17, the holder base 520 can be secured to the mounting base 820, and the mounting base 820 secured to the fixture post 900, in a variety of different manners to accommodate the alignment of the retainers 950. For example, referring jointly to FIG. 4 and sequentially to FIGS. 9 through 17, the base 820 may be secured to the holder base 520 using the mounting holes 850, 860 along one of the sides, and secured to the fixture post 900 to receive a retainer 950 oriented horizontally as shown in FIG.

Figure 10:
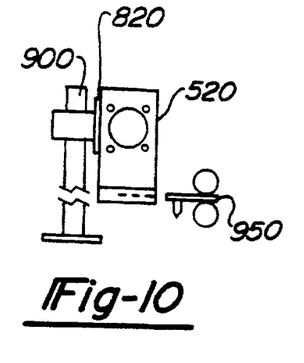
Figure 11:
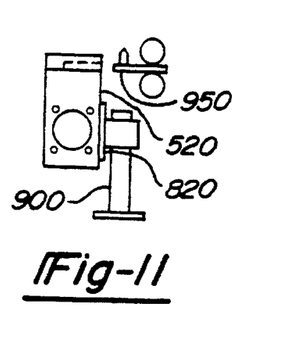
Figure 12:
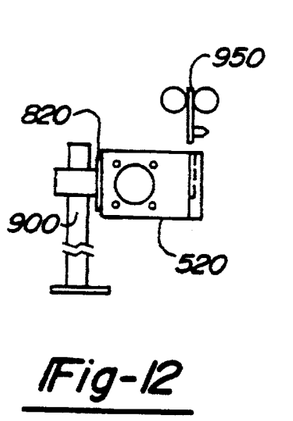
Figure 13:
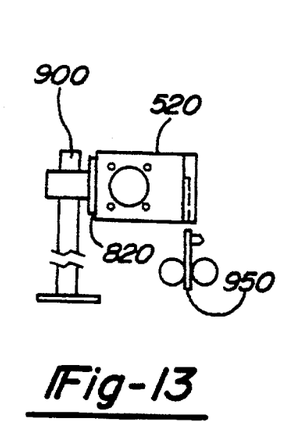
Figure 14:
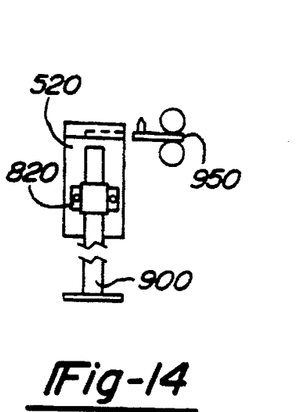
Figure 15:
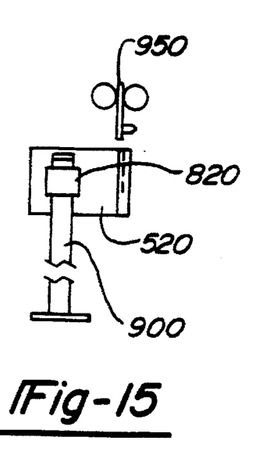
Figure 16:
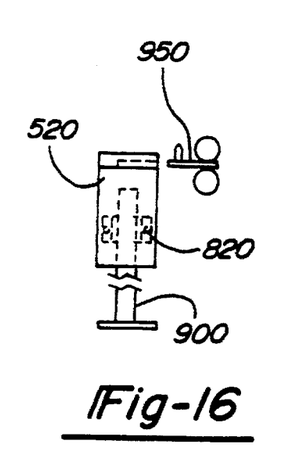
Figure 17:
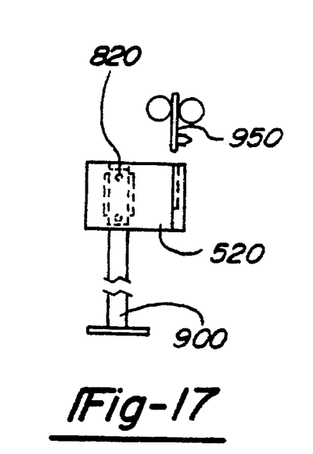

9. Or the base 820 may be rotated 180° and secured to the fixture post 900 to receive a horizontally aligned retainer 900 that is much closer to the work table surface, as shown in FIG. 10. Or the base may be aligned as in FIG. 9 but rotated about the fixture post 180° to produce the alignment shown in FIG. 11. Or the mounting base 820 may be secured to the mounting holes 850, 860 located along the bottom of the holder base 520 to provide for receiving retainers aligned vertically, such as shown in FIGS. 12 and 13. Or the mounting base 820 may be secured to mounting holes along the front or back face of the holder base 520. This provides for the types of alignments shown in FIGS. 14, 15, 16, and 17. The difference between the alignment shown in FIGS. 14 and 16 from that of FIGS. 15 and 17 is that the mounting base 820 is aligned along the vertical axis of the holder base 520 in FIGS. 14 and 16 and along the horizontal axis in FIGS. 15 and 17.

Figure 18:
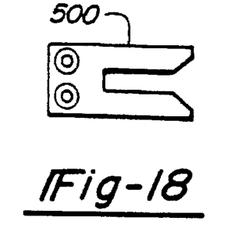
FIGS. 18 through 34 are plan views of some of the many different types of retainer holding plates which can be accommodated by the holder and detector assembly.
Figure 19:
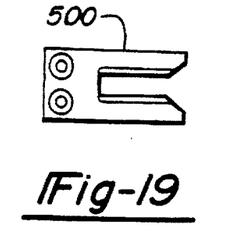
Figure 20:
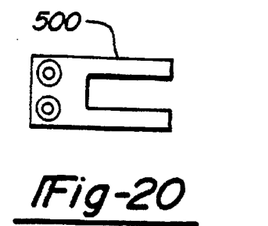
Figure 21:
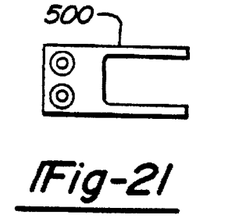
Figure 22:
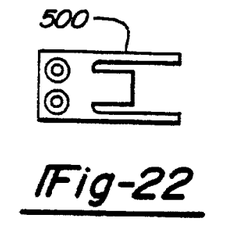
Figure 23:
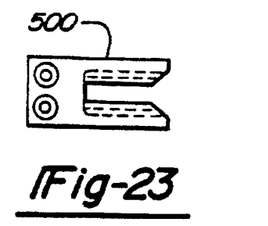
Figure 24:
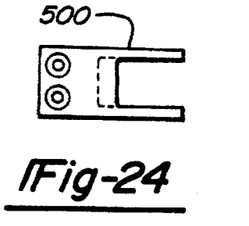
Figure 25:
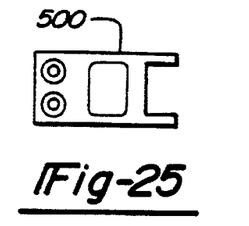
Figure 26:
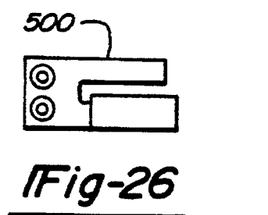
Figure 27:
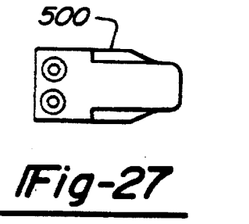
Figure 28:
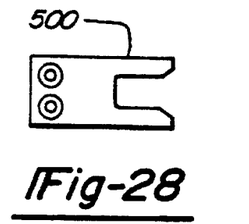
Figure 29:
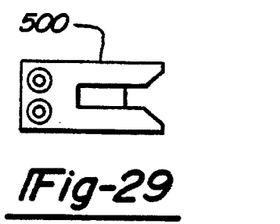
Figure 30:
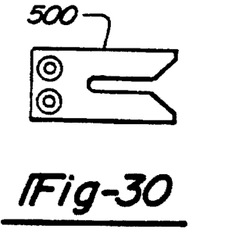
Figure 31:
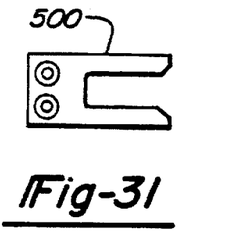
Figure 32:
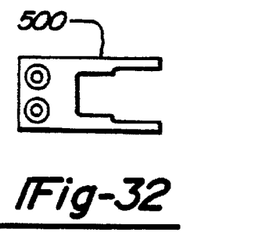
Figure 33:
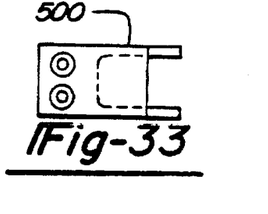
Figure 34:
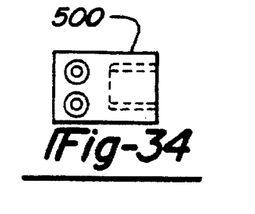

Finally, as shown in FIGS. 18 through 34, the holder 500 can be formed to suit a variety of retainers. For example, the holder 500 shown in FIG. 18 accepts a christmas tree type retainer as earlier described, while the holder of FIGS. 19, 20, 21 accept christmas tree type retainers having different shapes. To attach any of the different holders 500 to the base 520, the screws 525, 527 are simply removed and the old holder is detached from the base 520. A new holder 500 may then be secured to the base 520 by the screws 527—the detector 510 need not be realigned or replaced. By providing for the variety of base alignments shown in FIGS. 9 through 17 and by providing for the variety of holding elements 500 shown in FIGS. 18 through 34, it can be appreciated that the holder and detector of the present invention can be readily adapted to suit whatever types of wire harness and retainers are present. Also, since the detector generates a "retainer present" signal whenever a retainer has been inserted into the holder, the holder and detector of the present invention provides a convenient means of testing to ensure all the required retainers are present on the wire harness. Also, because the holder and detector can be readily moved from fixture post to fixture post and can be aligned in any number of alignments with respect to the fixture post, the wire harness can also be readily checked to ensure that the proper spacing between retainers exists. When the holders are placed on the work table, such as in FIG. 1, in a pattern that mimics the attachment points along the routing path of the wire harness within the vehicle, inserting the retainers into the holders ensures the retainers will mate with their respective attachment points when the wire harness is routed in the vehicle.

It can be appreciated that there may be other advantages of the present invention not enumerated in this description. Rather, the foregoing description of the presently preferred embodiment was provided for the purposes of illustration, and should not be construed to limit the invention. One of ordinary skill in the art can appreciate that a variety of modifications not described herein may be effected to the invention without departing from the spirit or scope of this invention.

We claim:

1. A testing apparatus for use in connection with the manufacture of a wire harness assembly for detecting the presence of a wire harness retainer element at a selected location on the wire harness assembly, said apparatus comprising:

a holding member having a channel for receiving the wire harness retainer element and a flange for holding the received retainer element in the channel;

a base for supporting said holding member, said base having a recessed channel formed in a first surface, said holding member mounted to said first surface of said base with the channel for receiving the retainer element disposed over the recessed channel of said base;

first contact means mounted in the recessed channel of said base;

second contact means mounted in the recessed channel of said base, said second contact means biased away from said first contact means toward said holding member, said second contact means being out of contact with said first contact means when the retainer element is not received within the channel of said holding member, said second contact means being in contact with said first contact means when the retainer element is received within the channel of said holding member; and circuit means for connecting said first and second contact means with a current source and generating a signal indicative of the presence of the received retainer element within the channel of said holding member;

wherein the base and wire harness assembly are arranged and secured to a work surface in such a pattern that a signal indicating the presence of the received retainer element within the channel of the holding member ensures that the retainer element is installed at the selected location on the wire harness assembly and will mate with its respective attachment point when the wire harness assembly is routed in a vehicle.

2. An apparatus as recited in claim 1 wherein said first contact means comprises a contact pin and said second contact means comprises a contact leaf having a leg portion having a distal end biased away from said contact pin.

3. A testing apparatus for use in connection with the manufacture of a wire harness assembly for detecting the presence of a wire harness retainer element at a selected location on the wire harness assembly, the retainer element having a base portion and a shank portion extending outwardly from said base portion, said apparatus comprising:

a holding member having a receiving channel for receiving the shank portion of the retainer element and a flange extending along the receiving channel so as to extend over the base portion of the received retainer element in the receiving channel;

a base for supporting said holding member, said base having a recessed channel formed in a first surface for receiving the base portion of the received retainer element, said holding member mounted to said first surface of said base with the receiving channel for receiving the shank of the retainer element disposed over the recessed channel of said base;

a contact pin disposed in the recessed channel of said base;

a contact leaf disposed in the recessed channel of said base, said contact leaf having a leg portion having a distal end being biased away from said contact pin toward said holding member, the distal end of the leg portion of said contact leaf being out of contact with said contact pin when the retainer element is not received within the recessed channel of said base, the distal end of the leg portion of said contact leaf being in contact with said contact pin when the retainer element is received within the recessed channel of said base; and circuit means for connecting said contact pin and contact leaf with a current source and generating a signal indicative of the presence of the received retainer element within the recessed channel of said base;

wherein the base and wire harness assembly are arranged and secured to a work surface in such a pattern that a signal indicating the presence of the received retainer element within the recessed channel of the base ensures that the retainer element is installed at the selected location on the wire harness assembly and will mate with its respective attachment point when the wire harness assembly is routed in a vehicle.

4. A testing apparatus for use in the manufacture of a wire harness assembly for detecting the presence of a wire harness retainer element at a selected location on the wire harness assembly, comprising:

a holder for receiving and holding the wire harness retainer element;

a detector for generating a signal indicative of the presence of the wire harness retainer element in the holder; and a base on which the holder and detector are mounted;

wherein the base and wire harness assembly are arranged and secured to a work surface in such a pattern that a signal indicating the presence of the wire harness retainer element in the holder ensures that the retainer element is installed at the selected location on the wire harness assembly and will mate with its respective attachment point when the wire harness assembly is routed in a vehicle.

5. The testing apparatus as set forth in claim 4, wherein the holder includes a channel for receiving a shank of the wire harness retainer element.

6. The testing apparatus as set forth in claim 5, wherein the base includes a recessed channel in which the detector is mounted, the recessed channel being aligned with the channel in the holder.

* * * * *

UNITED STATES PATENT AND TRADEMARK OFFICE
CERTIFICATE OF CORRECTION

PATENT NO.   :   5,661,453
DATED        :   Aug. 26, 1997
INVENTOR(S)  :   Justus et al.

It is certified that error appears in the above-indentified patent and that said Letters Patent is hereby corrected as shown below:

Column 3, line 39:  "for" should be --to--.

Column 7, line 25:  "screws 527" should be --screws 525, 527--.

Signed and Sealed this

Thirteenth Day of January, 1998

Attest:

BRUCE LEHMAN

Attesting Officer         Commissioner of Patents and Trademarks